(No Model.)
W. J. WILSON.
Grain Toller.
No. 230,378. Patented July 20, 1880.
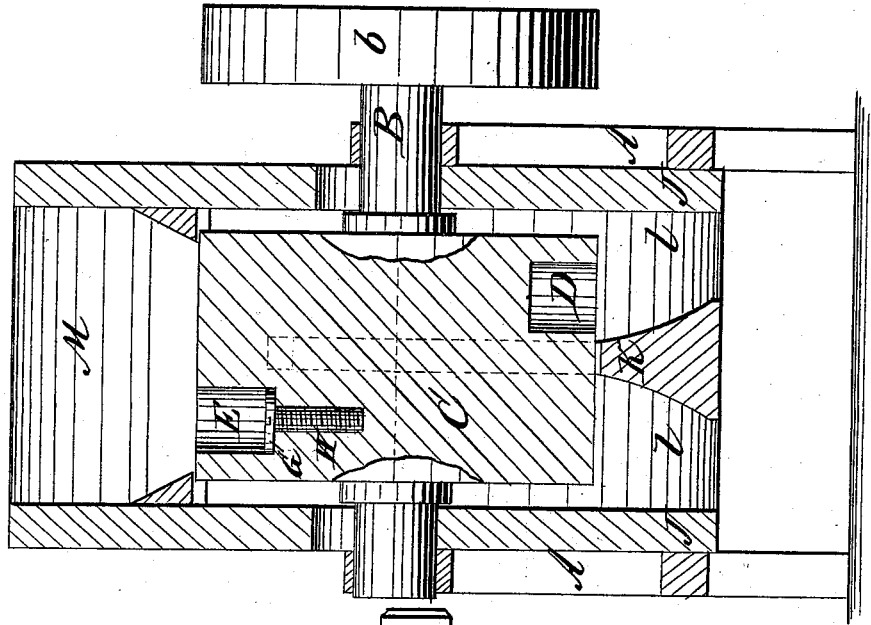
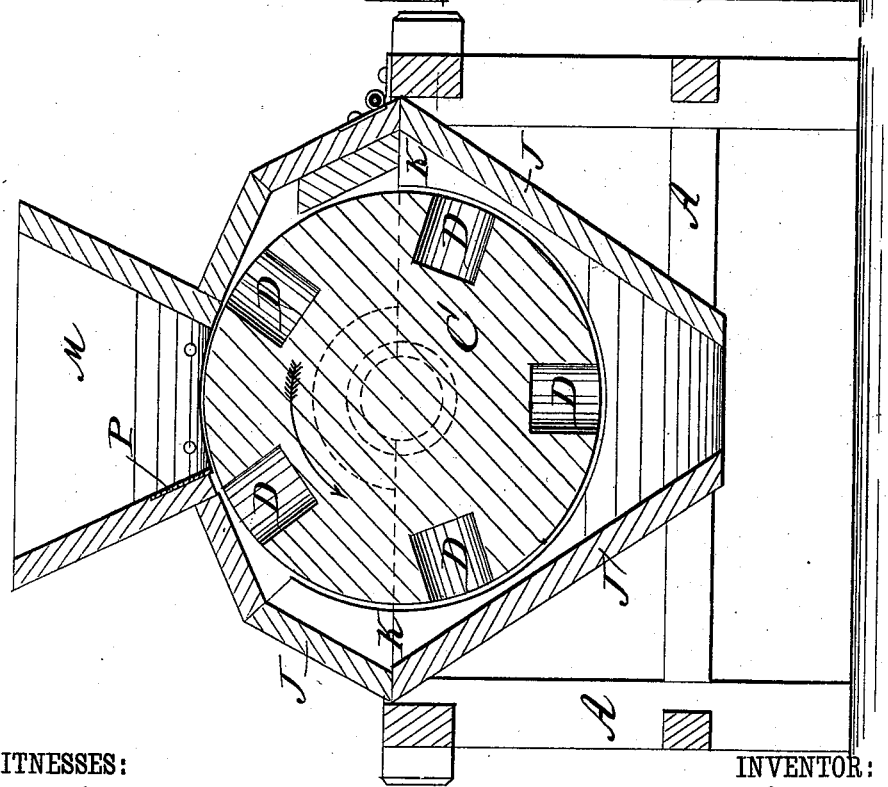
WITNESSES:
A. Schehl.
C. Sedgwick
INVENTOR:
W. J. Wilson
BY Munn & Co.
ATTORNEYS.

UNITED STATES PATENT OFFICE.

WILLIAM J. WILSON, OF STEPHENVILLE, TEXAS.

GRAIN-TOLLER.

SPECIFICATION forming part of Letters Patent No. 230,378, dated July 20, 1880.

Application filed April 27, 1880. (No model.)

*To all whom it may concern:*

Be it known that I, WILLIAM JOHN WILSON, of Stephenville, in the county of Erath and State of Texas, have invented a new and useful Improvement in Apparatus for Tolling Grain, of which the following is a specification.

My invention consists in a novel construction of a revolving cylinder provided with cavities representing certain measures, and of a casing in which said cylinder works, whereby provision is made for measuring the grain by the revolution of the cylinder, and at the same time separating a certain proportion thereof to be retained as toll, and whereby, also, provision is made for varying the size of the toll-measure, so as to enable it to separate different proportions from the main body of the grain, according to the amount of toll to be taken.

In the accompanying drawings, Figure 1 is a longitudinal vertical section of an apparatus embodying my improvements. Fig. 2 is a transverse vertical section of the same.

Similar letters of reference indicate corresponding parts.

A represents a frame-work supporting the apparatus. In the sides of the frame is journaled a shaft, B, which may be driven by a belt passing around a pulley, b, or in any other suitable manner. To the shaft B is attached a cylinder, C, in the face of which, toward one end, are a number of cavities, D, representing certain measures—as bushels or fractions thereof. There may be any desired number of these measures on the cylinder; but, as here shown, there are five.

Toward the opposite end of the cylinder is one cavity, E, similar to those above described, for taking toll.

When arranged as shown herein, there being five of the measures D, the amount of toll taken, as the cylinder revolves, will be one-sixth of the entire quantity of grain passed through the apparatus. In order, however, to provide for different rates of toll, the measure E is provided with an adjustable follower or false bottom, G, which may be raised or lowered, in order to vary the size of the measure according to the rate of toll to be taken. This follower may be provided with any suitable means for adjusting it. As here shown, the means provided consists of a screw, H, attached to the under side of the follower, and working in a tap-hole in the cylinder below the bottom of the cavity E. By screwing it in or out the follower may be lowered or raised, so as to increase or diminish the capacity of the measure E.

The cylinder B is inclosed by a casing, J, the upper portion of which may be hinged or removable for convenience of access to the interior. In this casing is a partition, K, fitting closely the surface of the cylinder and dividing the lower portion of the casing into two parts, terminating in two spouts, l l, one for discharging the main portion of the measured grain and the other for discharging the toll.

On the top of the casing rests a hopper, M, for receiving the grain to be measured. The bottom of this hopper fits nicely on the surface of the cylinder. On the side of the hopper toward which the cylinder revolves, as indicated by the arrow, is a metallic plate, P, which receives the friction of the grain, and thus prevents the wearing away of the wood-work of that portion of the hopper.

If desired, the cylinder may be made of wood, and the measures D and E faced with metal to prevent wear.

Having thus described my invention, I claim as new and desire to secure by Letters Patent—

1. The combination of the hopper M, having at the lower end the space l, divided by a partition, K, and a solid wheel, C, having the row of cavities D to measure the customer's grain, and the cavity E to measure the miller's toll, the said cavities D E being at some distance apart, near opposite edges of the wheel, as shown and described.

2. In a tolling-wheel, the measure E, provided with a false bottom having a subjacent screw, by which said bottom may be moved nearer to or farther from the top, as specified.

WILLIAM J. WILSON.

Witnesses:
   JAS. A. SHELTON,
   JAMES BEECH.